March 30, 1937. C. G. SUITS Re. 20,317

NONLINEAR CIRCUIT

Original Filed Jan. 21, 1931 3 Sheets-Sheet 1

Inventor:
Chauncey G. Suits,
by Harry E. Dunham
His Attorney.

March 30, 1937. C. G. SUITS Re. 20,317
NONLINEAR CIRCUIT
Original Filed Jan. 21, 1931 3 Sheets-Sheet 2
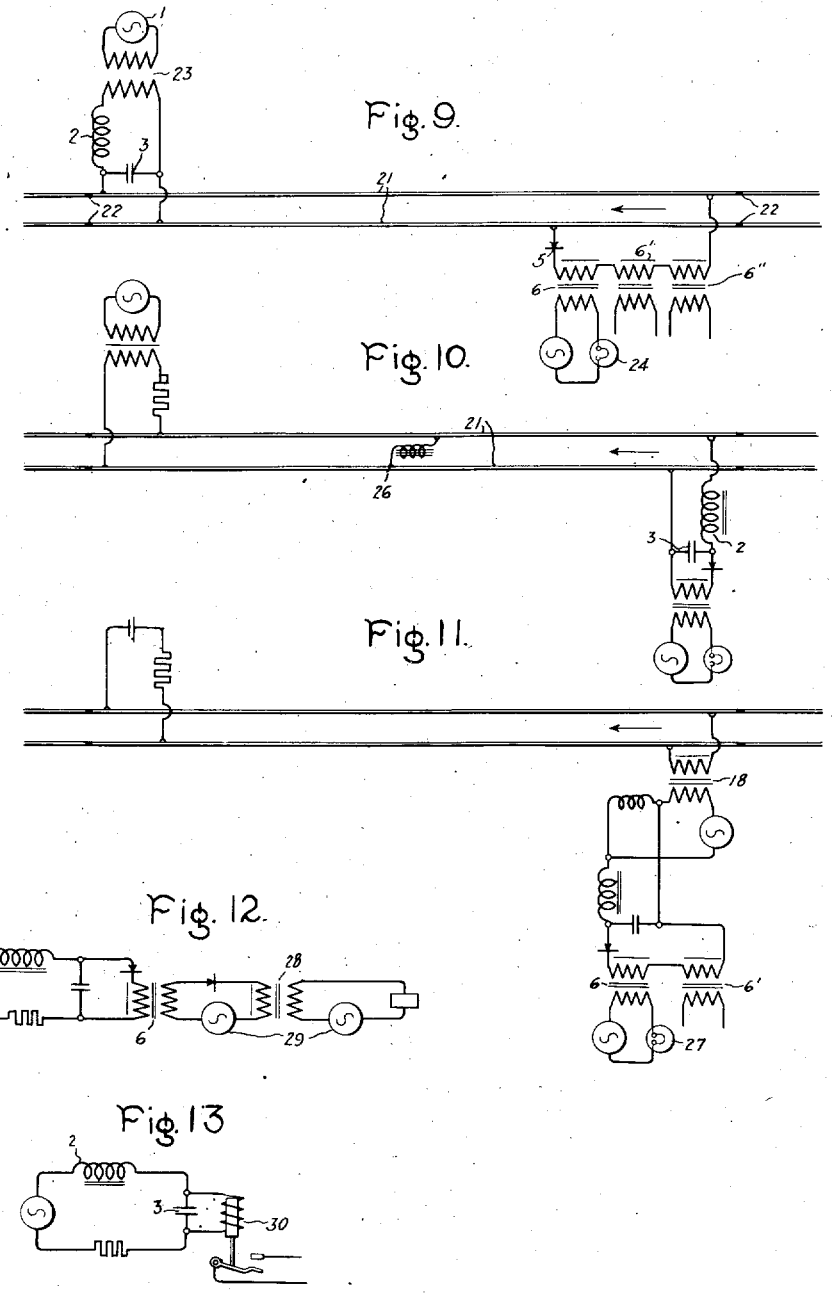
Inventor:
Chauncey G. Suits,
by Harry E. Dunham
His Attorney.

NONLINEAR CIRCUIT

Original Filed Jan. 21, 1931 3 Sheets-Sheet 3

Inventor:
Chauncey G. Suits,
by Harry E. Dunham
His Attorney.

Reissued Mar. 30, 1937 Re. 20,317

UNITED STATES PATENT OFFICE 20,317

NONLINEAR CIRCUIT

Chauncey G. Suits, Schenectady, N. Y., assignor to General Electric Company, a corporation of New York Original No. 1,921,786, dated August 8, 1933, Serial No. 510,246, January 21, 1931. Renewed December 31, 1932. Application for reissue August 3, 1935, Serial No. 34,644

14 Claims. (Cl. 246—34)

My invention relates to circuits having the property of non-linear, or ferro, resonance and it has for one of its objects to provide means whereby the utility of circuits of this type is greatly increased.

It is well known in the art that when a condenser of proper capacitance is connected in series with a reactance coil having a closed magnetic core and a source of alternating electromotive force the current in the circuit varies in a non-linear relation to the impressed voltage. That is, as the voltage in the circuit is gradually increased the current increases substantially linearly with the voltage until a certain value of voltage is reached at which saturation of the core of the inductance takes place and the inductance of the coil resonates with the capacitance of the condenser. The current then suddenly jumps to a very high value which is several times the value of current prior to the sudden increase. As the electromotive force is increased still further, the current again increases with respect to the impressed voltage in a substantially linear relation. These circuits may be said to have the property of non-linear, or ferro, resonance.

One of the objects of my invention is to provide means whereby the utility of circuits of the type indicated for general relay applications is greatly increased.

A further object of my invention is to provide a relay circuit which does not include electron discharge devices, and which is adapted to the sensitive control of large amounts of power in response to variations in a desired primary variable.

In circuits adapted to effect sensitive control of relatively large amounts of power in the past, either mechanical relays or a suitable type of electron discharge device have commonly been employed. I have found, however, that by utilizing non-linear resonant circuits in combination with circuit controlling saturable reactors in the manners later to be described, the desired results may be accomplished by means entirely electrical and without employing electron discharge devices.

Still a further object of my invention is to provide a ferro resonant circuit having the proper degree of non-linearity to cause it to have a maximum effect in controlling an electroresponsive device by means of which desired control operations are effected.

The non-linear properties of ferro resonant circuits are particularly applicable to the problem of railway block signalling and a further object of my invention is to provide improved means utilizing this property whereby the signal circuits at one end of a block may be reliably controlled in response to the slight voltage variations which occur between the rails of the block, due to voltage impressed between the rails at the opposite end thereof, when a train enters the block.

Figure 16:
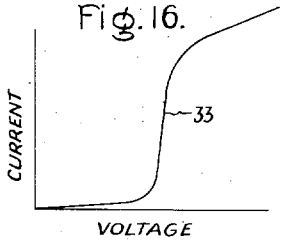
Figure 18:
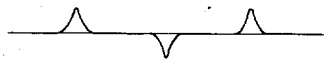
Figure 17:
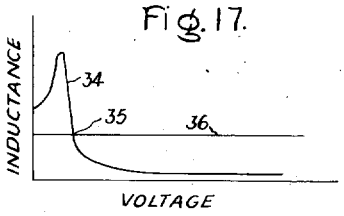
Figure 19:
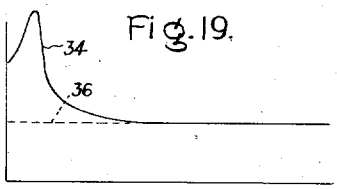
Figure 20:
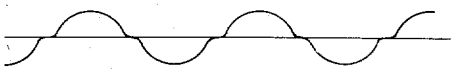

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Figs. 1, 3, 5, 6, 8, 9, 10, 11, 12, 13, 14 and 15 represent different embodiments of the invention; Figs. 2, 4 and 7 represent certain characteristics of the arrangements shown in Figs. 1, 3, 6 and 8; Figs. 16, 17 and 18 represent certain of the characteristics of non-linear circuits in general, and Figs. 19 and 20 represent certain characteristics of the circuits shown in Figs. 14 and 15.

Figure 1:
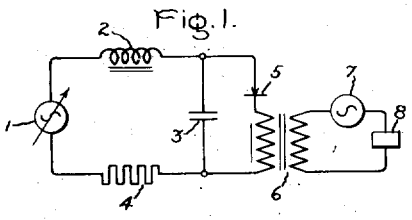
Figure 2:
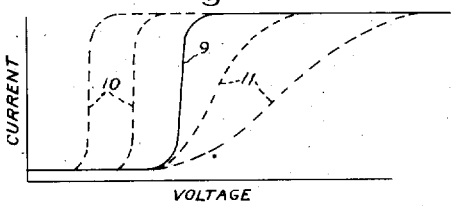

Referring to Fig. 1 of the drawings, I have shown a source of alternating electromotive force 1 of substantially constant frequency having connected in series therewith a non-linear inductance 2, a condenser 3 and a resistance 4, these elements comprising the ferro, or non-linear, resonant circuit. This circuit possesses the non-linear characteristic above described wherein when the impressed voltage of a circuit exceeds a certain value, the current in the circuit suddenly jumps to a very large value and then upon further increase in voltage the current varies in a substantially linear manner with respect to the voltage. This sudden increase in current is due to the saturation of the core of the reactor 2, this core being made of any suitable magnetic material such as iron, an alloy of iron and nickel or other suitable alloy. Connected across the condenser is a circuit comprising a rectifier 5 and the direct current winding of a saturable reactor 6. The alternating current winding of this reactor is connected in series with a source of electromotive force 7 and a load 8. The rectifier 5 may be of any suitable construction, such as rectifiers of the contact type. If desired this rectifier may be of the type shown in United States Patent No. 1,640,335, issued August 23, 1927 to Lars O. Grondahl. This rectifier may likewise be of either the full wave or half wave type. The reactor 6 is so constructed that the core thereof becomes saturated upon the sudden rise in current in the ferro resonant circuit whereupon its alternating current winding becomes of very much reduced impedance.

The operation of the arrangement thus described is illustrated by the curve 9 in Fig. 2 in which the impressed voltage of the source 1 is plotted as abscissa and current flowing in the load 8 is plotted as ordinate. It will be seen that for variations in voltage in the lower portion of the scale the impedance of the alternating current winding of the reactor 6 is very high so that the current in the circuit remains at a constant low value. At a certain fairly definite value of electromotive force of the source 1 the current in the load suddenly rises to a very high value indicated by the right-hand portion of the curve. Upon further increase in voltage the current in the circuit 8 remains constant.

I have found that by proper adjustment of the value of resistance 4 which is connected in series with the non-linear circuit when the impressed voltage 1 is again reduced the current suddenly falls at substantially the same impressed voltage at which the increase in current took place. This is not true, however, for other values of the resistance 4. Thus, for example, if the resistance 4 be reduced, it will be found that the increase in current takes place along the curve 9, whereas the decrease in current will take place along a curve corresponding to the curves 10 as shown in Fig. 2, the particular curve being dependent upon the value of the resistance 4. Thus if the resistance 4 is of too low a value, an operation is had analogous to the well known hysteresis effect in that the reduction of current in the load circuit takes place at a lower impressed voltage of the source 1 than does the corresponding rise in current in the load. This hysteresis effect, however, is eliminated by increasing the resistance. If the resistance is increased beyond a value corresponding to that which gives the system the characteristic represented by the curve 9, then the hysteresis effect disappears, but the non-linear properties of the circuit are gradually lost; that is, the current in the load 8 will increase with respect to the voltage of the source 1 in a manner indicated by curves 11 dependent upon the value of the resistance. The value of resistance, however, may be found wherein the hysteresis effect disappears and the non-linear properties of the circuit are preserved, as shown by the curve 9. This value of resistance is dependent to a certain extent upon the resistance in parallel with the condenser, but in any particular case it can be easily determined by trial.

It is preferable that the rectifier 5 be one in which the resistance decreases with an increase in current through the rectifier. This characteristic is obtained in rectifiers of the type comprising a copper plate having copper oxide formed thereon, together with electrodes arranged upon the copper plate and upon the oxide as shown in the above-mentioned patent to Lars O. Grondahl. This characteristic of the rectifier improves the operation of the circuit in that it tends to cause a substantially constant current in the secondary winding of the reactor 6 after the sudden rise in current. Thus it tends to flatten the right-hand portion of the curve 9 shown in Fig. 2. Thus, for example, as the voltage of the source 1 is slowly increased there is of course a very small voltage across the rectifier 5 until the reactor 2 becomes saturated and the sudden rise in current occurs. At this point the potential across the condenser becomes suddenly very large. As the voltage of the source 1 is now still further increased, the impedance of the rectifier 5 is diminished thereby tending to lessen the effect of condenser 3. That is, the decrease in impedance of rectifier 5 causes the impedance of the combination comprising reactor 2 and, condenser 3 connected in parallel with the branch comprising rectifier 5 and reactor 6 to increase. This effect tends to lessen the current in the reactor 2 at a progressively decreasing rate as the voltage increases. Thus the variation in impedance of rectifier 5 tends to compensate for increase in voltage of the source 1 and thereby to render more constant the degree of saturation of reactor 6 with respect to variation in voltage of the source 1 above the point at which the reactor 6 becomes saturated. It will be apparent that in this way not only is the right-hand portion of the characteristic 9 flattened but further a loss of power in the reactor 6 due to rise in current after the core is saturated is avoided.

With an arrangement as thus described, it will be apparent that the non-linear circuit 2—3 in combination with rectifier and reactor 6 operates as a very sensitive relay responsive to voltage of the source 1 to control the amount of power supplied from the source 7 to the load 8. The relay, however, is entirely electrical in that it employs no mechanical moving parts, such as contact members and further it employs no electron discharge devices.

Figure 3:
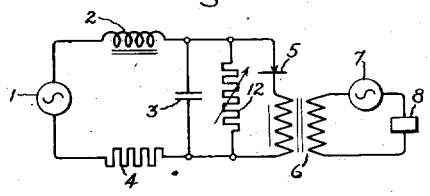
Figure 4:
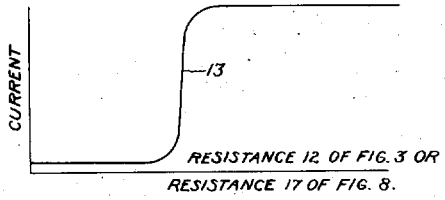

The arrangement shown in Fig. 3 is similar to that shown in Fig. 1 with the exception that in this case the primary variable in response to which it is desired to control a supply of current from the source 7 to the load 8 comprises a resistance 12 connected in parallel with the condenser 3 rather than factors affecting the voltage of source 1 as in Fig. 1. The resistance 12 may be varied in response to any desired primary variable such as temperature, pressure, intensity of light and the like.

The operation of this circuit is shown in Fig. 4 in which the value of the resistance 12 is plotted as abscissa and current is plotted as ordinates. If I assume that the value of the resistance 12 and the voltage of the source 1, which I will assume to be constant, is such that the current flowing in the load is represented by the right-hand portion of the curve 13, i. e. such that resonance occurs, then as the resistance 12 decreases the effect of condenser 3 is diminished sufficiently to suddenly throw the condenser 3 out of resonance with the reactor 2 thereby causing a sudden drop in current in the load 8 after which the current in the load 8 is represented by the left-hand portion of the curve 13. This operation may well be understood in view of the consideration that as the resistance 12 decreases both the real and imaginary components of the equivalent series impedance of the combination comprising condenser 3 and resistance 12 connected in parallel increase over a very wide range in value of the resistance 12.

Figure 5:
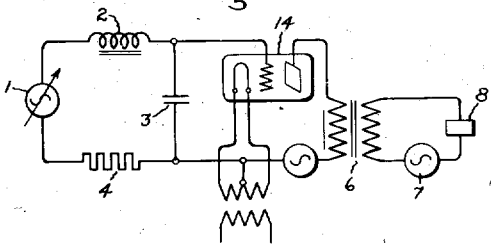

Fig. 5 is a modification of the circuit shown in Fig. 1 in which an electron discharge device 14 is substituted for the rectifier 5, the grid and cathode of the electron discharge device being connected across the condenser 3 and the direct current winding of the reactor 6 being connected in series with the anode of the discharge device. The impedance between the grid and cathode of the discharge device is reduced somewhat upon increase in voltage, but the effect of the tube 14 in tending to diminish the current flowing in the reactor 2 will not be so great as is the case of the circuit shown in Fig. 1.

Figure 6:
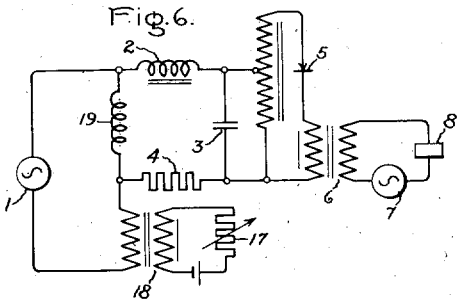
Figure 7:
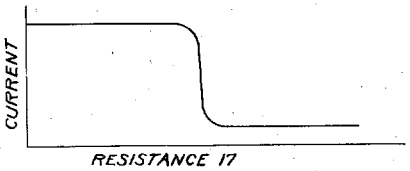

Fig. 6 shows an arrangement in which the supply of current to the load 8 is varied in response to a unidirectional electromotive force which may be represented by the potential upon resistance 17. This resistance is connected in series with the direct current winding of a saturable reactor 18, the alternating current winding of which is connected across a source of electromotive force 1 in series with an inductance 19. The potential of the inductance 19 is supplied to the non-linear circuit 2—3 through the resistance 4. The resistance 17 may be considered as being controlled, either with respect to the value of the resistance, or the potential thereon, in response to a primary variable, such as heat, pressure, or degree of light. This resistance thus controls the current flowing in the direct current winding of the reactor 18 thereby varying the degree of saturation of the reactor. This, in turn, by variation of the impedance of the alternating current winding of the reactor 18 controls the potential upon inductance 19. The circuit is further modified in that the potential of the condenser 3 is stepped up by means of an autotransformer before rectification.

It will be apparent that the supply of alternating electromotive force to the non-linear circuit 2—3—4 may be effected without the use of inductance 19. I have found, however, that in a circuit of this kind where a reactor is employed having uni-directional magnetic flux an unstable condition is likely to result. That is, if we assume that the value of resistance 17, or the potential thereon, is just at the critical value at which the reactor 18 saturates, it may occur that the reactor will alternately saturate and desaturate in a substantially periodic way thereby causing current to be intermittently supplied to the load 8. This operation results from an increase in impedance of the alternating current winding of reactor 18 which accompanies increase of current over a very large range in this winding. Thus, for example, as resistance 17 is gradually diminished a point will be reached at which the circuit comprising inductance 2, condenser 3 and alternating current winding of reactor 18 are in resonance. The current in this circuit then tends to jump suddenly to a very high value. This increase of current, however, so increases the impedance of reactor 18 as to destroy the resonant condition thereby causing a sudden diminution of current, this operation repeating itself in a periodic way. The period of this pulsation in any particular circuit is determined predominantly by the alternating voltage of source 1 and the direct current in reactor 18. Such an arrangement is advantageous in many applications such for example as in the control of flasher signals at airports, railroad crossings and the like. Circuits of this type are described and claimed in United States Letters Patent No. 1,921,787 granted August 8, 1933 upon my copending application, Serial No. 510,750, filed Jan. 23, 1931, and entitled "Pulsation apparatus". It is frequently desirable, however, to effect the control of the load through a reactor having unidirectional magnetic flux in which the operation of the system is stable. I have found that the unstable condition can be avoided by connecting a linear element, such as a resistance or an inductance 19, in the manner shown. This element should be such that a substantial portion, such as 80% of the total current flows through it.

The operating characteristic of this circuit is shown in Fig. 7 in which the abscissa may be taken as the value of resistance 17, or the voltage thereon, whereas the ordinates are current in the load 8.

Figure 8:
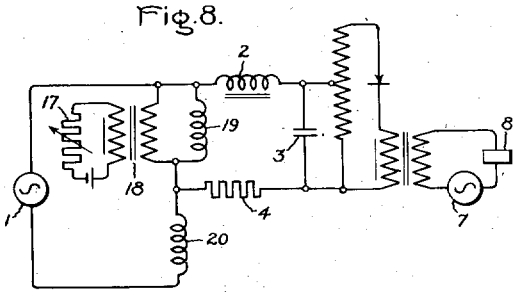

Fig. 8 shows a similar circuit modified in that the alternating current winding of the saturated reactor 18 is connected in shunt with the inductance 19. Inductance 19 should be such that it carries a substantially greater current than reactor 2 and condenser 3. In this circuit the inductance 19 serves to stabilize the circuit and the inductance 20 which is connected in series with the source 1 serves to prevent short circuit of the source 1 when the reactor 18 is saturated. The characteristic of this circuit has the same form as that indicated in Fig. 4 if values of resistance 17 are considered as abscissa.

Fig. 9 shows my invention as applied to the problem of actuating block signals in response to electromotive force which is impressed between the track rails. Thus, for example, in this figure, 21 represents the rails of one block of a railway system, these rails being insulated from the other blocks as indicated at 22. Alternating current is supplied from the source 1 through a transformer 23 and reactor 2, condenser 3 being connected across the rails, these elements comprising the non-linear circuit. At the opposite end of the block one or more saturable reactors 6, 6′, 6″ are connected across the rails in series with the rectifier 5. In the operation of this embodiment of the invention a large current is normally flowing in the non-linear circuit comprising elements 2 and 3 and as a result a substantial voltage is impressed between the rails of the track causing the reactors 6, 6′ and 6″ to be saturated. The alternating current winding of the reactor 6 may, for example, be employed to control the green lamp of the block signal system thereby indicating an unoccupied condition of the block. The reactors 6′ and 6″ may if desired be utilized to control signals in the adjacent blocks or for any desired purpose whatever. If desired of course these reactors may be omitted from the circuit. When a train comes into the block the resistance across the condenser 3 is reduced and as a result, as explained in connection with Fig. 3, the circuit 2—3 is thrown out of resonance. The voltage applied to the track is therefore greatly reduced and the reactors 6, 6′ and 6″ are desaturated causing a corresponding change in the various signals.

Considerable difficulties are commonly encountered in the operation of block signals in response to electromotive force between the rails due to the fact that the inherent resistance between the rails varies widely during different weather conditions. Thus in dry weather this resistance is high, whereas in wet weather it becomes very low. Thus in wet weather the change in voltage between the rails when a train comes into the block is very slight. The increase in resistance between the rails, however, due to dry weather conditions is compensated for by variation in the resistance of the rectifier 5 to a considerable degree. Thus as the resistance between the rails increases the voltage across the rectifier 5 tends to increase thereby causing a reduction in resistance of the rectifier which in turn reduces the resistance between the rails. In this way the resistance between the rails may be maintained at a comparatively constant low value during varying weather conditions. The system may then be adjusted to alter the condition of saturation of the reactor 6 in response to the variation which results from the presence of a vehicle in the block.

Fig. 10 shows a modification of the arrangement in which the non-linear circuit is connected across the rails at the entrance end of the block. The operation of this arrangement is believed to be obvious from the explanation already given. To maintain a more nearly constant impedance between the rails 21 during diverse weather conditions, however, a reactor 26 may be connected between the rails at any desired point in the block, this reactor tending to saturate as the voltage between the rails increases as in dry weather conditions. This expedient, however, may or may not be employed as desired.

Fig. 11 shows a further modification in that unidirectional electromotive force is impressed upon the rails rather than alternating electromotive force and in that the direct current winding of a reactor 18 corresponding to the reactor 18 of Fig. 8 is connected across the rails at the entrance end. The rest of the circuit is identical with that shown in Fig. 6 with the exception that the auto-transformer is removed and the load comprises the signal lamp 27. A second saturable reactor 6′ is connected in series with the reactor 6 to control additional signals if desired.

In certain applications where it is desired to control very large amounts of power in response to minute variations in a source of electromotive force or other primary variable, it may be necessary to amplify the effect produced by the non-linear resonant circuit. This may be done by connecting two or more saturable reactors in tandem as shown in Fig. 12. In this figure, reactor 28 is connected in tandem with the reactor 6 of the other figures, a rectifier being connected in series with the winding functioning in the previous embodiments as the alternating current winding of the reactor 6 and the direct current winding of the reactor 28. Alternating electromotive force is of course applied to each of the alternating current windings of the reactors by means of sources 29. I have found that two rather poorly designed reactors connected as shown in Fig. 12 may cause a power amplification of 500 times between the direct current circuit of the reactor 6 and the alternating current circuit of reactor 28.

In Fig. 13, I have shown a further modification in that the condenser 3 of the non-linear resonant circuit is connected in shunt with the winding of a mechanical relay. It is desirable where a mechanical relay is to be operated without the use of saturable reactors of the type indicated at 6 in the remaining figures that the winding of the relay be connected in parallel with the condenser of the non-linear resonant circuit since when connected in this way after the current in the resonant circuit increases as due to saturation of the reactor 2, and the relay 30 becomes energized and attracts its armature, the impedance of the winding of the relay is increased due to the fact that the magnetic path becomes of reduced reluctance. The impedance, however, is not increased sufficiently to throw the circuit 2—3 out of resonance, but it is increased sufficiently to cause a diminution of the current in the winding of the relay and a reduction of losses. It is of course well known that the current necessary in a mechanical relay to maintain the armature attracted is much less than that necessary to attract the armature.

Figure 14:
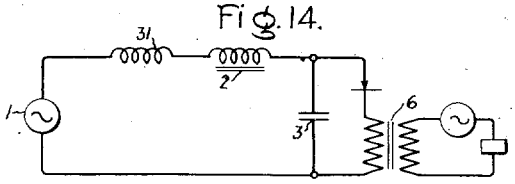
Figure 15:
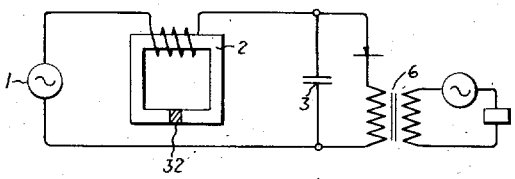

In Figs. 14 and 15, I have shown means whereby the amount of direct current available for saturation of the reactor 6 may be increased thereby permitting this reactor to be one adapted to control greater amounts of current in its alternating current winding. In Fig. 14, this modification consists in adding an inductance 31 in series with the non-linear circuit, this inductance being one having linear characteristics; that is, an inductance having either an air core or a magnetic core with an air gap such that it is not saturated at the values of current at which the reactor 2 is saturated. Substantially the same effect may be produced by designing reactor 2 in the manner shown in Fig. 15. Thus in this figure the reactor 2 has a magnetic core having a gap 32 comprising a metal such as an alloy of nickel and iron whereby the material of the gap saturates at a magnetizing force which is small as compared with that required to saturate the remainder of the core.

The operation of these modifications of the invention may best be understood by reference to Figs. 16, 17, 18, 19 and 20. Thus, for example, if I refer to Fig. 16, the curve 33 indicates the relation between the voltage and current in the circuit comprising inductance 2 and capacity 3 when connected directly across the source 1, it being asumed that there is no impedance connected across the condenser. The inductive reactance of the coil 2 varies with respect to the impressed voltage in the general manner indicated by the curve 34 of Fig. 17. Thus, for example, as the alternating electromotive force increases the inductance increases to a point where the reactance saturates. It then drops rapidly to a comparatively small value corresponding to the region 35 of the curve and then drops more slowly to a small constant value of the order of the air core reactance of the winding. The capacitive reactance of the condenser 2 is constant and may be represented by the curve 36 of Fig. 17. It may thus be seen that if each half cycle of the voltage wave is of sufficient magnitude to cause saturation of the reactance, there will be an interval during each half cycle represented by the point 35 at which the curves 34 and 36 cross in which the inductive reactance and the capacitive reactance of the circuit is zero. Thus at these intervals the impedance of the circuit is a minimum and the current is a maximum. Thus as a result the current flowing in the circuit has the form shown in Fig. 18 comprising a sharp impulse of short duration during each half cycle. The peak value of this impulse will of course be dependent upon the value of the impressed voltage and the included ohmic resistance of the circuit. I have found that if a suitable linear inductance is now added to the circuit in the manner described in connection with either Fig. 14 or Fig. 15 to cause the inductive reactance of the coil 2 after it becomes saturated substantially to equal the capacitive reactance as shown for example in Fig. 19, then the effective value of the current flowing in the circuit is very materially increased. Thus, for example, if I assume that the curve 34 of Fig. 19 represents the total inductance of the circuit shown in either Fig. 14 or Fig. 15 and that the capacitive reactance is represented by the dotted line 36, it will be seen that after the reactor 2 becomes saturated the inductive reactance is substantially equal to the capacitive reactance for practically all values of current. Thus if I cause the reactor 2 of Fig. 14 to saturate at a comparatively early time in each half cycle, then the current in the circuit will have the form shown in Fig. 20, this current having a substantial sine wave form during a large portion of the half cycle when resonance occurs and having a practically zero value during the remainder of the half cycle. It will be obvious that the effective value of a wave of this form is substantially greater than that of a wave shown in Fig. 18 and accordingly, when rectified, will produce a direct current of great magnitude which may be used to saturate a reactance 6 of increased dimensions.

While I have shown particular embodiments of my invention, it will of course be understood that I do not wish to be limited thereto, since many modifications both in the circuit arrangement and in the instrumentalities employed may be made and I contemplate by the appended claims to cover all such modifications as fall within the true spirit and scope of my invention.

What I claim as new and desire to secure by Letters Patent of the United States, is,—

1. In combination, a source of alternating electromotive force, a circuit comprising a condenser and an inductance coil arranged on a saturable core connected in series across said source, said condenser having capacitance such that it resonates with said coil only when said core is saturated, means responsive to a primary variable to control the degree of saturation of said core whereby the current in said condenser varies non-linearly with respect to said primary variable, a winding arranged on a second saturable core, and means for controlling the saturation of said last-mentioned core in response to voltage on said condenser whereby the impedance of said winding varies between wide limits in response to relatively small changes in said primary variable.

2. In combination, a circuit comprising a source of alternating electromotive force, an inductance and condenser connected across said source and arranged for non-linear resonance, a reactor having an alternating current winding and a direct current winding, said windings being arranged on a saturable core, and means to supply direct current to said direct current winding in accordance with the voltage on said condenser, said saturable core being adapted to saturate when said circuit becomes resonant.

3. In combination, a circuit comprising a source of alternating electromotive force, an inductance and a condenser connected in series, means to control the current in said circuit in accordance with a primary variable, said inductance and condenser being so constructed that the current in said circuit varies non-linearly over a certain range of variations of said variable, a reactor having a saturable core and a direct current winding and an alternating current winding thereon, an asymmetrically conducting device connected with said direct current winding in series across said condenser, and the impedance of said asymmetrically conducting device being variable in an inverse relation with respect to the voltage on said condenser whereby after the core of said reactor becomes saturated further increases of current in said circuit are prevented.

4. In combination, a source of variable alternating electromotive force, a coil having a saturable core and a condenser connected in series across said source, whereby the current in said coil and condenser varies nonlinearly with respect to the electromotive force of said source, and an electro-responsive device connected in parallel with said condenser, said device being so constructed that its impedance is higher when the voltage on said condenser is low than when said voltage is high.

5. In combination, a source of alternating current, a saturable reactor and condenser connected in series therewith and arranged for non-linear resonance, a variable impedance connected across said condenser whereby the current in said circuit varies over a wide range in response to relatively small variations in said impedance, and an electro-responsive device connected across said condenser.

6. In combination, a source of alternating electromotive force of substantially constant frequency, an inductance and condenser connected in series across said source and arranged for non-linear resonance whereby the current in said circuit varies over a wide range in response to comparatively small variations in electromotive force of said source, a circuit controlling reactor having a plurality of windings arranged on a saturable core, and a rectifier comprising a copper electrode having cuprous oxide formed thereon, one of said windings of said reactor and said rectifier being connected in series across said condenser.

7. In combination, a source of variable alternating electromotive force having substantially constant frequency, a circuit comprising an inductance and condenser connected in series across said source, said inductance and condenser being arranged to produce wide variations in current in said circuit when the voltage of said source varies within narrow limits, a circuit controlling saturable reactor, and means to control the saturation of said circuit controlling reactor in response to the voltage on said condenser whereby the impedance of said circuit controlling reactor is varied between wide limits in response to relatively small variations of said source.

8. In combination, a source of alternating electromotive force, a non-linear resonant circuit connected across said source, means comprising a reactor having a direct current winding for controlling the current in said non-linear resonant circuit, a source of current for energizing said winding, and means to prevent intermittent pulsation of said circuit due to said direct current field.

9. In combination, a block of railway track, a source of alternating electromotive force connected across said track at one end of said block, a saturable reactor connected to respond to electromotive force between the rails at the other end of said block, an inductance and condenser arranged for non-linear resonance in circuit between said reactor and said source of alternating electromotive force and means whereby the voltage on said condenser is rectified and supplied to said saturable reactor.

10. In combination, a block of railway track, a source of alternating electromotive force, a condenser connected across the rails at one end of the block, a saturable reactor connected in circuit between said condenser and said source of alternating electromotive force and adapted to be normally saturated and for resonance with said condenser, a reactor having a direct current control winding, an asymmetrically conducting device, said direct current winding and said asymmetrically conducting device being connected in series across the rails at the other end of the block, said asymmetrically conducting device having an impedance which varies inversely with the impressed voltage thereby to compensate variations in impedance between the rail during different weather conditions, and a signal controlled by said reactor.

11. In combination, a source of variable alternating electromotive force, a coil having a saturable core and a condenser connected in series across said source whereby the current in said coil and condenser varies non-linearly with respect to the electromotive force of said source, and an electro-responsive device connected in parallel with said condenser, said device being so constructed that its impedance is different for relatively high and low values of voltage respectively across said condenser.

12. In combination, a source of variable alternating electromotive force, a coil having a saturable core and a condenser connected in series across said source whereby the current in said coil and condenser varies non-linearly with respect to the electromotive force of said source, and an electro-responsive device connected in parallel with said condenser.

13. In combination, an electric circuit comprising a saturable inductance element, a capacitance element, and a resistance element arranged in series relation for non-linear resonance for a critical value of voltage applied to said circuit, and an electro-responsive device connected in a parallel circuit with said capacitance element.

14. In combination, a source of alternating electromotive force and a non-linear resonant circuit including a saturable reactor and condenser connected to be energized from said source, said non-linear circuit having a linear component of inductance such that the total inductive reactance of said non-linear circuit is substantially constant and of a value equal to the capacitive reactance of said condenser for substantially the whole of each half cycle of the alternating current wave for all values of applied voltage greater than the critical voltage at which said non-linear circuit exhibits its initial critical rise in current.

CHAUNCEY G. SUITS.